(12) United States Patent
Carnevali

(10) Patent No.: US 8,162,368 B2
(45) Date of Patent: Apr. 24, 2012

(54) VEHICLE CONSOLE HAVING MOLDED END PARTS

(76) Inventor: Jeffrey D. Carnevali, Seattle, WA (US)

( * ) Notice: Subject to any disclaimer, the term of this patent is extended or adjusted under 35 U.S.C. 154(b) by 149 days.

(21) Appl. No.: 12/383,663

(22) Filed: Mar. 27, 2009

(65) Prior Publication Data

US 2010/0090492 A1 Apr. 15, 2010

Related U.S. Application Data

(63) Continuation-in-part of application No. 12/287,622, filed on Oct. 10, 2008, now Pat. No. 7,802,832.

(51) Int. Cl.
*B60N 3/00* (2006.01)
(52) U.S. Cl. .................................. 296/24.34
(58) Field of Classification Search .............. 296/34.34, 296/37.8, 70; 351/829
See application file for complete search history.

(56) References Cited

U.S. PATENT DOCUMENTS

| | | | | |
|---|---|---|---|---|
| 1,417,401 A | * | 5/1922 | Mahoney | 312/297 |
| D218,438 S | | 8/1970 | Shook et al. | |
| 3,550,001 A | | 12/1970 | Hanley | |
| 3,931,894 A | * | 1/1976 | Murphy | 211/189 |
| 3,964,810 A | * | 6/1976 | Murphy | 312/265.2 |
| 3,984,161 A | | 10/1976 | Johnson | |
| 4,116,513 A | * | 9/1978 | Ullman, Jr. | 312/348.2 |
| 4,313,646 A | * | 2/1982 | Millhimes et al. | 439/654 |
| D279,329 S | | 6/1985 | Dzak | |
| 4,577,788 A | * | 3/1986 | Richardson | 224/483 |
| 4,733,900 A | | 3/1988 | Fluharty | |
| 4,846,382 A | | 7/1989 | Foultner et al. | |
| 5,005,898 A | | 4/1991 | Benedetto et al. | |
| 5,128,830 A | * | 7/1992 | Deluca et al. | 361/695 |
| 5,174,621 A | * | 12/1992 | Anderson | 296/70 |
| 5,181,555 A | | 1/1993 | Chruniak | |
| 5,199,273 A | * | 4/1993 | Silva et al. | 62/298 |
| 5,199,772 A | | 4/1993 | Jordan | |
| 5,223,977 A | * | 6/1993 | Bennett | 359/530 |
| 5,259,655 A | * | 11/1993 | Anderson | 296/70 |
| 5,282,556 A | | 2/1994 | Bossert | |
| 5,338,081 A | * | 8/1994 | Young et al. | 296/37.14 |
| 5,418,836 A | * | 5/1995 | Yazaki | 455/569.2 |
| 5,462,350 A | * | 10/1995 | Brightman et al. | 312/351.7 |
| D363,916 S | | 11/1995 | Johnson | |
| 5,503,565 A | * | 4/1996 | McCoy | 439/171 |
| 5,680,974 A | | 10/1997 | Vander Sluis | 224/281 |
| 5,743,585 A | * | 4/1998 | Pranger et al. | 296/37.12 |
| 5,775,825 A | * | 7/1998 | Hong et al. | 400/693 |
| 5,857,726 A | * | 1/1999 | Yokoyama et al. | 296/70 |
| 5,894,007 A | * | 4/1999 | Younessian et al. | 264/522 |
| 6,048,020 A | | 4/2000 | Gronowicz et al. | |
| D425,475 S | | 5/2000 | Herer | |
| 6,062,623 A | * | 5/2000 | Lemmen | 296/37.8 |
| 6,086,129 A | | 7/2000 | Gray | |
| D429,209 S | | 8/2000 | Inchaurregui | |
| D429,684 S | | 8/2000 | Johnson | |
| 6,123,377 A | | 9/2000 | Lecher et al. | |
| D434,365 S | | 11/2000 | Herer et al. | |
| 6,176,534 B1 | * | 1/2001 | Duncan | 296/37.12 |
| D437,299 S | | 2/2001 | Johnson | |

(Continued)

*Primary Examiner* — Kiran B. Patel
(74) *Attorney, Agent, or Firm* — Charles J. Rupnick, Attorney at Law

(57) ABSTRACT

A reconfigurable vehicle console having two substantially rigid end panels, wherein at least one and optionally both of the two end panels consist of a molded material. A pair of substantially rigid side panels are interconnectable with the two end panels. A plurality of face plates are securable with the side panels.

8 Claims, 5 Drawing Sheets

U.S. PATENT DOCUMENTS

| | | | |
|---|---|---|---|
| D438,841 S | 3/2001 | Smith | |
| 6,198,633 B1 * | 3/2001 | Lehman et al. | 361/756 |
| D443,246 S | 6/2001 | Smith | |
| D443,855 S | 6/2001 | Herer et al. | |
| 6,246,580 B1 * | 6/2001 | Weng | 361/695 |
| D447,998 S | 9/2001 | Pfeiffer et al. | |
| 6,315,347 B1 * | 11/2001 | Gotz | 296/72 |
| D453,318 S | 2/2002 | Moore | |
| 6,388,881 B2 * | 5/2002 | Yamauchi et al. | 361/704 |
| 6,428,072 B1 | 8/2002 | Moore | |
| 6,431,580 B1 * | 8/2002 | Kady | 280/655 |
| 6,504,710 B2 * | 1/2003 | Sutton et al. | 361/679.41 |
| 6,557,955 B2 * | 5/2003 | Saravis | 312/111 |
| 6,709,041 B1 | 3/2004 | Hotary et al. | |
| 6,816,391 B2 * | 11/2004 | Davis et al. | 361/818 |
| 6,843,521 B1 * | 1/2005 | Oana | 296/70 |
| 6,990,909 B2 * | 1/2006 | Gosling et al. | 108/50.02 |
| 7,048,346 B2 * | 5/2006 | Saravis | 312/111 |
| 7,149,081 B2 * | 12/2006 | Chen et al. | 361/679.36 |
| 7,165,687 B1 * | 1/2007 | Stevens et al. | 211/86.01 |
| 7,166,799 B2 * | 1/2007 | Chen et al. | 174/50 |
| 7,184,261 B2 * | 2/2007 | Chung | 361/679.56 |
| 7,210,725 B2 * | 5/2007 | Moore | 296/37.8 |
| 7,252,196 B1 * | 8/2007 | Koefelda et al. | 206/511 |
| 7,407,210 B2 * | 8/2008 | Arbaugh et al. | 296/24.34 |
| 7,416,235 B2 * | 8/2008 | Rajappa et al. | 296/37.8 |
| 7,472,969 B2 * | 1/2009 | Saravis | 312/111 |
| 7,495,925 B2 * | 2/2009 | Chen et al. | 361/726 |
| 7,644,830 B2 * | 1/2010 | Vroon | 220/1.5 |
| 7,663,881 B2 * | 2/2010 | Kuo | 361/692 |
| 2005/0035618 A1 * | 2/2005 | Toth et al. | 296/24.34 |
| 2006/0250052 A1 * | 11/2006 | Davis et al. | 312/107 |
| 2007/0145870 A1 * | 6/2007 | Uffner et al. | 312/257.1 |
| 2008/0024969 A1 * | 1/2008 | Sun et al. | 361/683 |
| 2009/0072565 A1 * | 3/2009 | Mayne, Jr. | 296/24.34 |
| 2010/0218350 A1 * | 9/2010 | De La Fuente et al. | 27/7 |
| 2010/0246155 A1 * | 9/2010 | Snider et al. | 361/818 |

* cited by examiner

VEHICLE CONSOLE HAVING MOLDED END PARTS

This application is a Continuation-in-part patent application Ser. No. 12/287,622 filed in the name of the same inventor on Oct. 10, 2008, now U.S. Pat. No. 7,802,832, which is incorporated herein by reference.

FIELD OF THE INVENTION

The present invention relates to vehicle consoles and in particular to one that provides novel molded end panels, the console being mountable within a vehicle driver compartment to support equipment in a location easily accessible to a driver of the vehicle.

BACKGROUND OF THE INVENTION

Police officers, public safety officers, firefighters, paramedics and the like carry various types of equipment in their vehicles. Several pieces of equipment are often carried in a single vehicle, and the driver often needs to operate the equipment while simultaneously driving the vehicle. Thus, various devices exist to secure multiple pieces of equipment within a vehicle so that they are accessible to the driver and/or other persons in the vehicle driver compartment.

These devices commonly include a hollow rectangular box situated on the floor of the vehicle between the driver seat and front passenger seat, including a horizontal top portion having an upwardly facing opening for receiving pieces of equipment. Police cruisers, for example, are commonly fitted with equipment boxes of this type. The boxes are used to house various types of equipment and controls used by police officers, such as radios, siren controls and light bar controls. Typically, the boxes are sized and positioned so that most of the box extends between the driver seat and the front seat. Only a small portion, if any, of the box will extend forward toward the dashboard beyond the driver seat and front passenger seat. In some police cruisers, the equipment box extends all the way back to the prisoner partition separating the rear seating area from the driver compartment. A laptop computer is often positioned between the box and dashboard, and is secured to the vehicle floor with various types of mounting hardware.

Systems employing the conventional equipment box described above suffer from a number of problems associated with the structure of the box. The box includes machined side and end panels, typically of steel or an aluminum alloy. Well known limitations of metal working require the metal end panels of the prior art to have square and sharp edges and corners that, even when broken, remain uncomfortable and even dangerous to the vehicle driver and passengers. Even when manufactured of bent sheet metal, consoles of the prior art have relied on square corners and edges without significant rounding or beveling.

The conventional equipment box configuration described above thus fails to provide safe corner and edge configurations, and the vehicle occupants are discomforted and even endangered.

Furthermore, consoles of the prior art are manufactured in fixed lengths so that changing the console's length requires replacement with an entire new console.

SUMMARY OF THE INVENTION

The present invention is a reconfigurable vehicle console having two substantially rigid end panels, wherein at least one and optionally both of the two end panels consist of a molded material. A pair of substantially rigid side panels are interconnectable with the two end panels. A plurality of face plates are securable with the side panels.

According to another aspect of the novel console, each of the molded end panels has a plurality of substantially smooth edge contours that intersect at substantially smooth corner contours. By example and without limitation, the contours are rounds.

According to another aspect of the novel console, the two molded end panels each terminate in opposing recessed side mounting surfaces wherein the side panels are seated recessed substantially flush with the exposed portions of the end panels.

According to another aspect of the novel console, a plurality of the pairs of the side panels are provided, with at least two of the plurality of pairs of side panels having different lengths.

According to another aspect of the novel console, a method is provided of configuring the vehicle console.

Other aspects of the invention are detailed herein.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF PREFERRED EMBODIMENT

In the Figures, like numerals indicate like elements.

Figure 1:
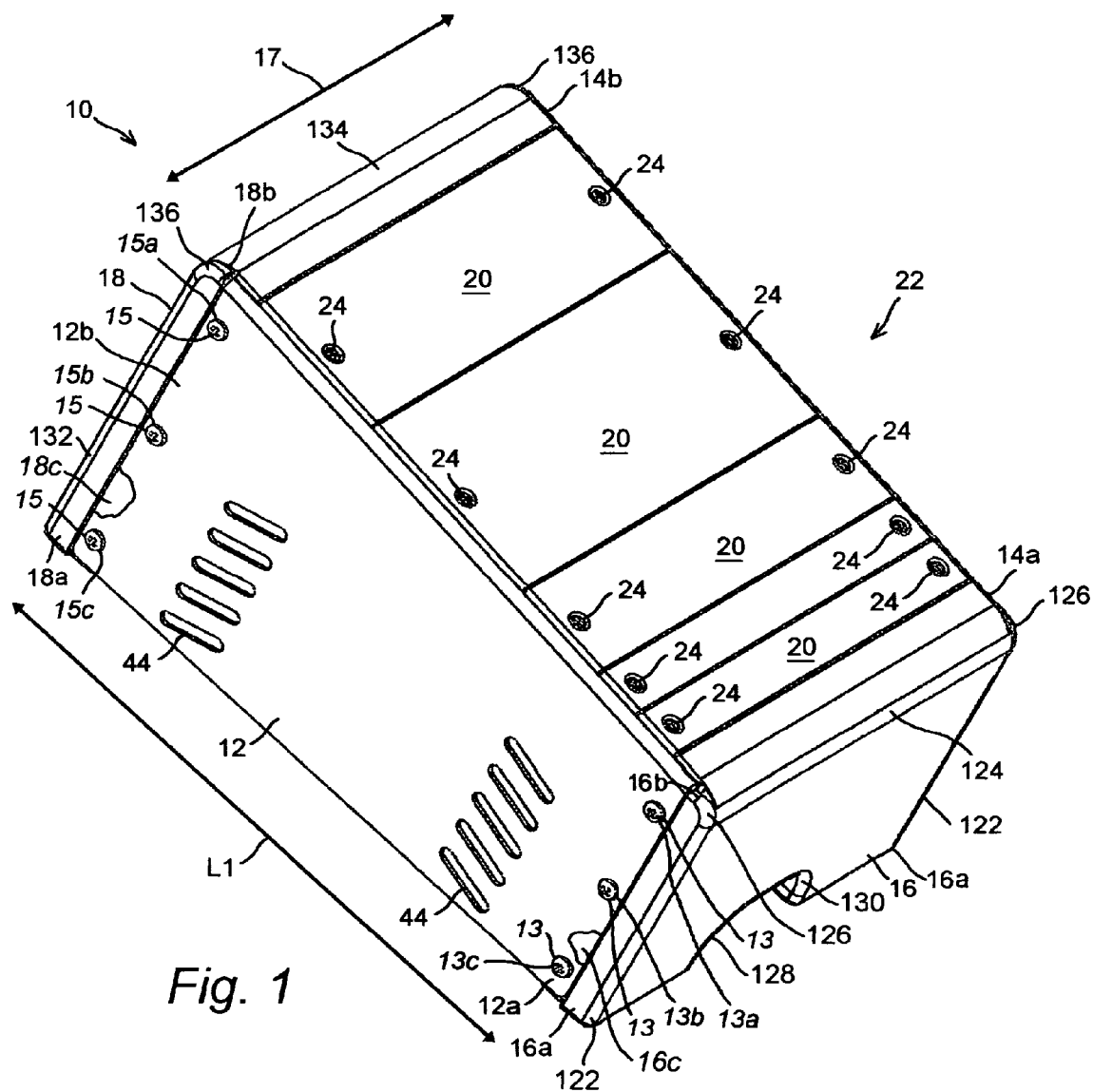
FIG. 1 is a perspective view showing an example of the novel reconfigurable vehicle console.

FIG. 1 is a perspective view that illustrates a novel reconfigurable vehicle console 10 having opposing first and second substantially rigid side panels 12 and 14 and opposing first and second substantially rigid end panels 16 and 18. The end panels 16, 18 are formed with first and second opposing recessed side edge mounting surfaces 16c, 16d and 18c, 18d, shown in partial break away of side panels 12, 14, respectively. The first edge mounting surfaces 16c, 18c of the end panels 16, 18 are substantially rigidly interconnected between first and second end connection portions 12a and 12b of the first side panel 12. The second edge mounting surfaces 16d, 18d of the end panels 16, 18 are substantially rigidly interconnected between first and second end connection portions 14a and 14b of the second side panel 14. Optionally, the side edge mounting surfaces 16c, 16d and 18c, 18d are recessed by about the thickness of the side panels 12, 14 such that the first and second end connection portions 12a, 12b and 14a, 14b of respective side panels 12 and 14 are approximately flush mounted with portions of the end panels 16, 18 exposed by the side panels 12, 14.

The first end connection portions 12a, 14a of two side panels 12, 14 extend substantially from a base 16a of the first end panel 16 to its crown 16b. The second end connection portions 12b, 14b of two side panels 12, 14 extend substantially from a base 18a of the second end panel 18 to its crown 18b. The first end connection portions 12a, 14a of two side panels 12, 14 and opposing edges of the first end panel 16 are formed with one or more cooperating connection points 13. The second end portions 12b, 14b of two side panels 12, 14 and opposing edges of the second end panel 18 are formed with one or more cooperating connection points 15. By example and without limitation, the first end connection portions 12a, 14a of two side panels 12, 14 connect with the opposing edges of the first end panel 16 at the connection points 13 by means of connectors 13a, 13b and 13c. The second end portions 12b, 14b of two side panels 12, 14 connect with the opposing edges of the second end panel 18 at the connection points 15 by means of connectors 15a, 15b and 15c. The connectors 13a, 13b, 13c and 15a, 15b, 15c are, for example, threaded fasteners or other removable and interchangeable connectors. The cooperating connection points 13 are formed in substantially identical positions on both the first end connection portions 12a, 14a of two side panels 12, 14 and the opposing edges of the first end panel 16. The cooperating connection points 15 are formed in substantially identical positions on both the second end portions 12b, 14b of two side panels 12, 14 and the opposing edges of the second end panel 18. The side panels 12, 14 thus have cooperating connection points 13, 15 and with respective end panels 16, 18. More or fewer connection points 13, 15 are also contemplated and may be included or substituted without deviating from the scope and intent of the present invention.

The end panels 16, 18 are substantially the same width such that the side panels 12, 14 are spaced apart a substantially uniform or constant distance 17 between the end panels 16, 18, thereby forming a substantially rectangular support frame 19.

Furthermore, it is generally well known that consoles of the prior art are manufactured in fixed lengths so that changing the console's length requires buying a whole new console. The method disclosed herein permits any of the original console manufacturer, the distributor, the wholesaler, retailer, installer or end user of the console 10 to change the console 10 to any of several lengths. Accordingly, the console 10 is convertible to different lengths as illustrated in the figures.

Side panels 12, 14 are manufactured in different lengths L1, L2 and L3, all having the same first heights for each of the first end connection portions 12a, 14a, and the same second heights for each of the second end portions 12b, 14b. The first end connection portions 12a, 14a of two side panels 12, 14 connect with the recessed edges of the first end panel 16 at substantially identical connection points 13 using either the same or identical connectors 13a, 13b, 13c. Similarly, the second portions 12b, 14b of two side panels 12, 14 connect with the recessed edges of the second end panel 18 at substantially identical connection points 15 using either the same or identical connectors 15a, 15b and 15c. Here, the console 10 is illustrated with a pair of side panels 12, 14 of a first length L1.

As illustrated herein, different side panels 12, 14 of any length L1, L2 and L3 are provided that mate with the opposing first and second substantially rigid end panels 16 and 18. The only effective difference between different side panels 12, 14 of different lengths is the angle of slope of the upper mounting lip 100 to the respective first and second end connection portions 12a, 12b and 14a, 14b. This variation in the angle of slope of the upper mounting lip 100 for different lengths of the side panel pairs 12, 14 is only provided when the measurement from base 18a to crown 18b of the second end panel 18 is different from the measurement from base 16a to crown 16b of the first end panel 16. Accordingly, regardless of length any pair of side panels 12, 14 of the same length L1, L2 or L3 may be interconnected between first and second end connection portions 12a, 12b and 14a, 14b of the respective side panels 12, 14. Thus, by changing just a single component, the pair of side panels 12, 14, the console 10 can lengthened or shortened to fit different needs or different vehicles. In the prior art, the user could only change the length of a console by buying an entire new different console. Now, by providing interchangeable pairs of side panels 12, 14 of different lengths L1, L2 and L3 the present invention makes it possible to lengthen or shorten the console 10 without buying a whole new console. The present console 10 is a truly modular console system that can be reconfigured for use in different vehicles by just replacing side panels 12, 14, or just reconfigured for use in the same vehicle to accommodate more or fewer pieces of equipment or other utilities.

A plurality of substantially interchangeable face plates 20 are removably clamped to the side panels 12, 14 of the rectangular support frame 19 between the opposing end panels 16, 18. For example, a plurality of the interchangeable face plates 20 are removably clamped between the side panels 12, 14 for partially forming a top or upwardly facing surface 22 of the console 10 when installed. One or more pair of releasable connectors 24, such as fasteners or releasable clamps, secures each of the face plates 20 to the side panels 12, 14. More or fewer of the face plates 20 are utilized depending upon the length L1, L2 or L3 of the console side panels 12, 14.

Figure 2:
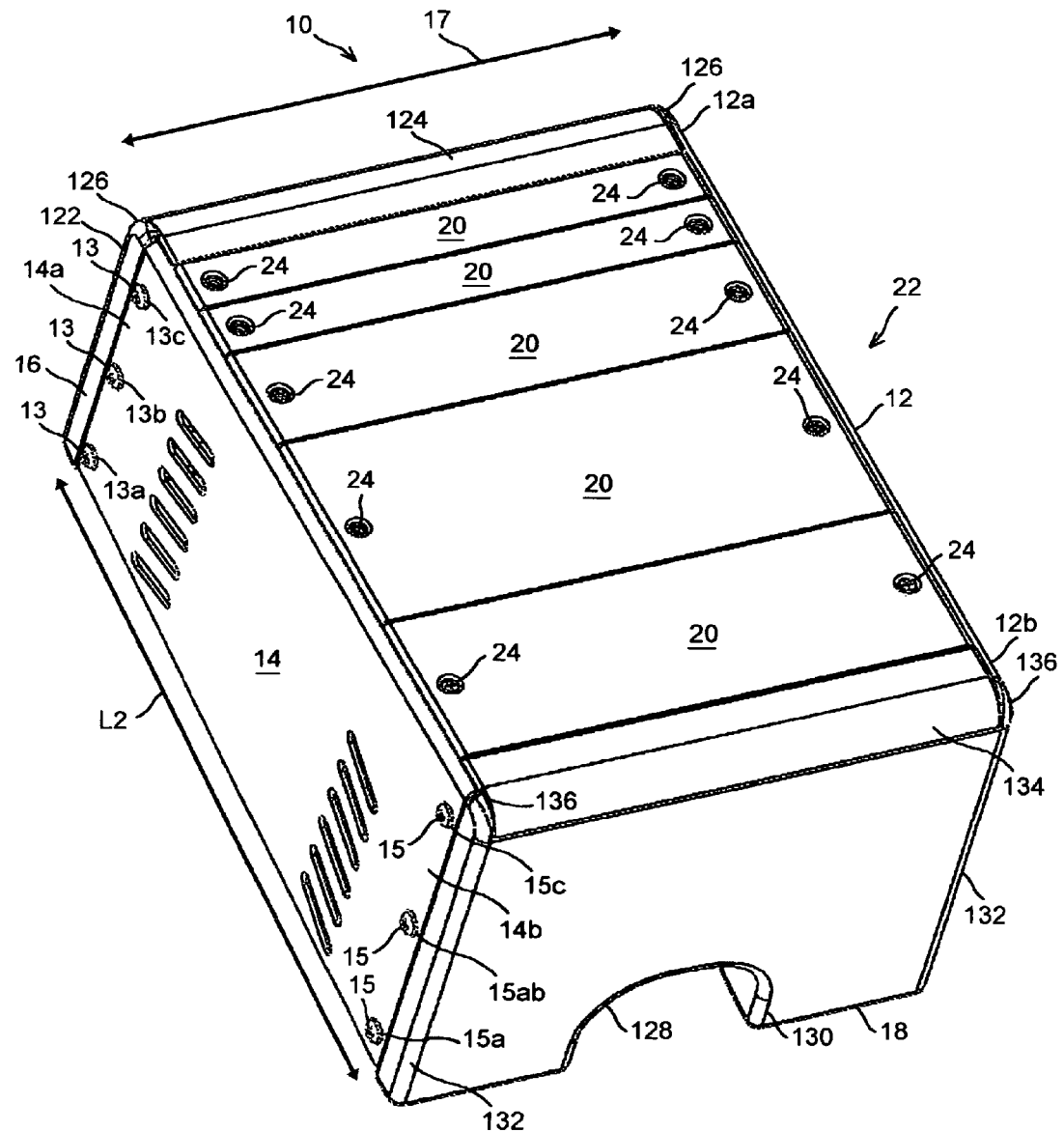
FIG. 2 illustrates the novel reconfigurable vehicle console of FIG. 1 viewed from the opposite end.

FIG. 2 illustrates the novel reconfigurable vehicle console 10 of FIG. 1 viewed from the opposite end panel 18. Here, the console 10 is assembled with a side panel pair 12, 14 having a second length L2 different from the length L1 illustrated in FIG. 1. Accordingly, by simply changing the side panel pair 12, 14 to a pair having a different length the length of console 10 is changed. More of the face plates 20 can be used with the longer console 10, thereby increasing its utility.

Figure 3:
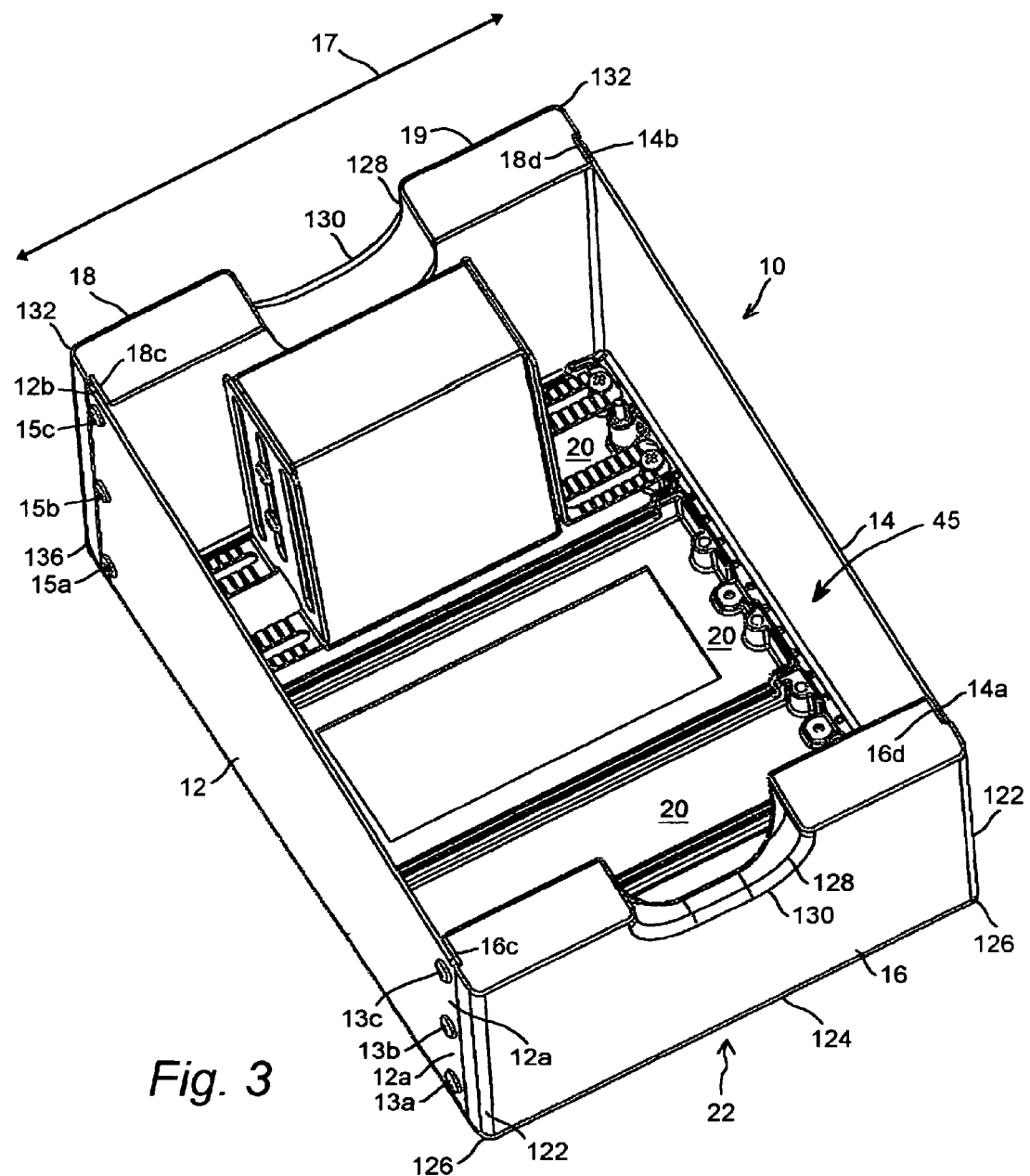
FIG. 3 is a view of the novel reconfigurable vehicle console from its underside.

FIG. 3 is a view of the novel reconfigurable vehicle console 10 viewed from the underside opposite from the top or upwardly facing surface 22 and showing the interior portion 45 of the console 10. Here, the side edge mounting surfaces 16c, 16d and 18c, 18d are more clearly illustrated as being optionally relieved or recessed by about the thickness of the side panels 12, 14 such that the first and second end connection portions 12a, 12b and 14a, 14b of respective side panels 12 and 14 are approximately flush mounted with portions of the end panels 16, 18 exposed by the side panels 12, 14. As disclosed herein, the first end connection portions 12a, 14a of the two side panels 12, 14 connect with the opposing edges of the first end panel 16 at the connection points 13 by means of connectors 13a, 13b and 13c. The second end portions 12b, 14b of the two side panels 12, 14 connect with the opposing edges of the second end panel 18 at the connection points 15 by means of connectors 15a, 15b and 15c.

Figure 4:
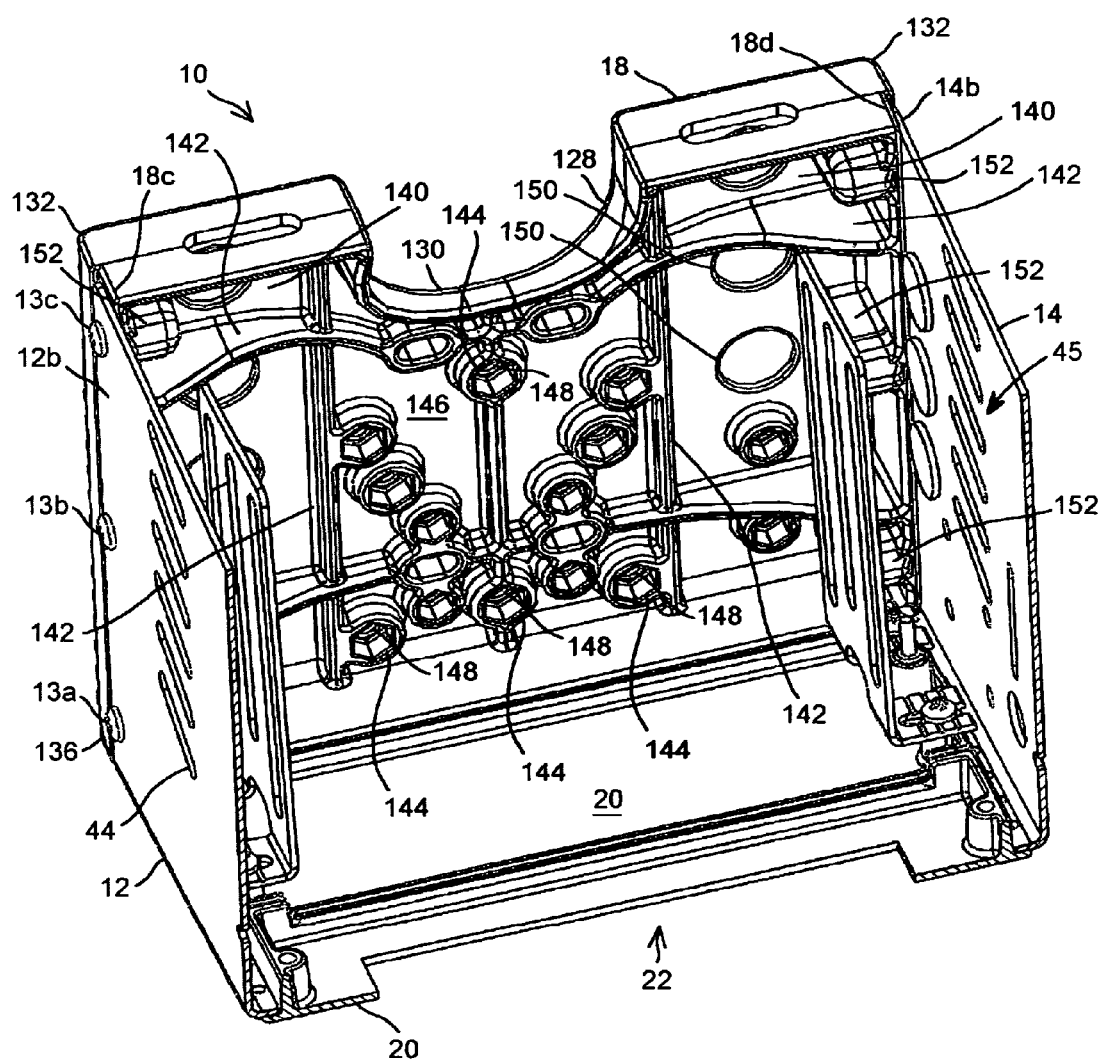
FIG. 4 is a section view of the novel console showing an interior view.

FIG. 4 is a section view of the console normal to the end panel 18 showing interior 45 of the console 10. End panels of prior art consoles are machined, typically of steel or an aluminum alloy. In contrast, as illustrated here, the first and second substantially rigid end panels 16, 18 (shown) of the present modular console 10 are molded, for example, of an injection moldable plastic, composite or metal material. The first and second substantially rigid end panels 16, 18 of the present modular console 10 are thus manufactured easily and inexpensively as individual units of relatively rigid molded plastic, composite or metal parts.

As illustrated in herein, the first and second substantially rigid end panels 16 and 18 are molded with smooth, continuously rounded molded edges 122, 124 and 132, 134, respectively, which intersect at smooth, continuously rounded molded edges corners 126 and 136, respectively. Such rounding of the edges and corners was unknown in the rigid end panels of prior art consoles at least because rounding corners and edges requires the material be thick enough to take the rounding without breaking through the corner. For example, a ¼ inch radius requires the manufacturer to begin with plate material at least ¼ inch thick or thicker. Such extremely thick material required to provide even a ¼ inch round on corners and edges would make the end console product so heavy it could not be lifted by the end user. Thus, to provide a viable product, the prior art relied on square corners and edges without significant rounding or beveling. Else, the console was manufactured of sheet metal bent to provide rounded edges with open corners to permit folding. This failure of the prior art to provide rounded corners and edges caused the consoles of the prior art to be square and sharp edged, which discomforted and even endangered the vehicle occupants.

In contrast to the uncomfortable and even dangerous square and sharp edged corners and edges provided by consoles of the prior art, the present modular console 10 utilizes molded first and second substantially rigid end panels 16, 18. The molding process permits the substantially rigid end panels 16, 18 to have significantly rounded corners and edges for the safety and comfort of the user and other vehicle occupants. As illustrated in FIG. 1, for example, the molded first end panel 16 has substantially smooth, continuous molded edge contours 122 and 124 for its exposed side and top edges, as well as smooth, continuous molded top corner contours 126 at the exposed intersections of the side and top edge contours 122, 124. For example, side and top edge contours 122, 124 are molded rounds or bevels that avoid dangerous sharp edges and generally smooth the contour of the console 10. The top corner contours 126 are similarly molded rounds or bevels that avoid dangerous sharp corners and generally smooth the contour of the console 10. A clearance recess 128 for the vehicle's drive line hump (not shown) in front-engine, rear-wheel drive automobiles is optionally provided in the molded end panel 16 with a molded interior edge round 130. Clearance recess 128 for the vehicle drive line hump (not shown) in rear-wheel drive automobiles is also optionally provided in the molded second end panel 18 with molded interior edge round 130. The molded second end panel 18 has smooth, continuous molded rounds 132 and 134 for its exposed side and top edges, as well as molded smooth, continuous top corner rounds 136 at the exposed intersections of the side and top rounds 132, 134. All the exposed side and top edge contours 122, 124 and 132, 134, as well as the corner contours 126 and 136, are optionally about ½ inch radius rounds to ensure safety and comfort not available in prior art consoles.

The substantially rigid molded end panels 16, 18 of the present console 10 are thus manufactured easily and inexpensively as individual units of relatively rigid molded nylon, plastic, composite or metal parts, including the respective side edge rounds 122, 132, respective top edge rounds 124, 134, as well as respective top corner rounds 126, 136.

When molded of nylon, plastic or composite material the end panels 16, 18 remain substantially rigid as well as tough and sturdy but, in contrast to the prior art, are light weight. Molding also permits easy formation of reliefs and reentrant hollows 140 that further lighten the end panels 16, 18. End panels 16, 18 are optionally molded with one or more stiffening ribs 142. By example and without limitation, the end panels 16, 18 are each molded with a plurality of the stiffening ribs 142 such that substantial rigidity is retained despite reentrant hollows 140.

Threaded fasteners are often utilized for securing external attachments to the console. Machined or folded sheet metal consoles of the prior art required the installer to access the interior portion 45 of the console 10 to fit a nut onto a threaded fastener. If the interior portion 45 of the console 10 was not accessible, other complex solutions needed to be utilized, such as welding nuts to the end panels, or utilizing clips for holding the nuts while the threaded fastener was turned. In contrast to such complex prior art solutions, one or more nut pockets 144 are optionally molded on interior surfaces 146 of the end panels 16, 18 in positions substantially concentric with corresponding molded-through apertures 148 for threaded fasteners. Nut pockets 144 make easy supporting nuts for the threaded fasteners, without requiring access to the interior portion 45 of the console 10. Additionally, wire feed through and other small access holes 150 are optionally molded through the end panels 16, 18 to their interior surfaces 146.

Figure 5:
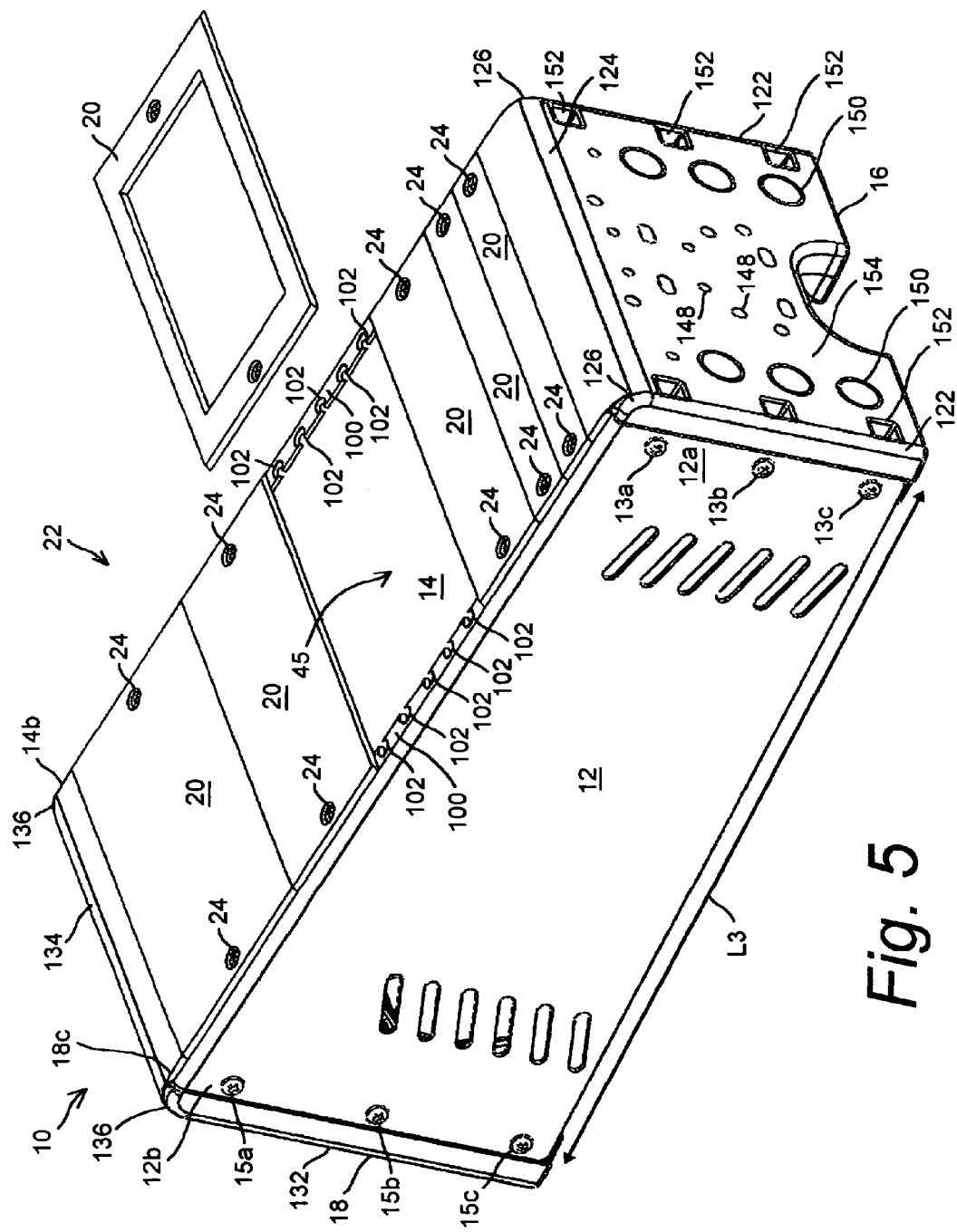
FIG. 5 illustrates installation/removal of a face plate from the novel console.

According to one embodiment, side nut pockets 152 are also provided in the molded end panels 16, 18. Side nut pockets 152 hold nuts for engagement by the connectors 13a, 13b, 13c and 15a, 15b, 15c for securing the side panels 12, 14. As shown in FIG. 5, nut pockets 152 may be accessed through the face 154 of either end panel 16, 18.

FIG. 5 illustrates installation/removal of one of the face plates 20 from the console 10. As illustrated here, side panels 12, 14 are each further formed with an upper mounting lip 100 bent at right angles and facing one another inwardly across the console 10. The mounting lips 100 support the face plates 20. Furthermore, the mounting lips 100 are formed with a plurality of apertures 102 spaced substantially evenly there along. The face plates 20 are secured to the mounting lips 100 pairs of releasable connectors 24.

Here, the console 10 is assembled with a side panel pair 12, 14 having a third length L2 different from the length L1 illustrated in FIG. 1 and the length L2 illustrated in FIG. 2. Accordingly, by simply changing the side panel pair 12, 14 to a pair having a different length the length of console 10 is changed. More of the face plates 20 can be used with the longer console 10, thereby increasing its utility. However, the shorter console 10 assembled with the side panel pair 12, 14 of shorter length L1 or L2 may be a better fit in some vehicle applications.

While the preferred and additional alternative embodiments of the invention have been illustrated and described, it will be appreciated that various changes can be made therein without departing from the spirit and scope of the invention. Therefore, it will be appreciated that various changes can be made therein without departing from the spirit and scope of the invention. Accordingly, the inventor makes the following claims.

What is claimed is:
1. A reconfigurable modular console, comprising:
two substantially rigid end portions, at least one of the two end portions further consisting of a molded material;
a pair of substantially rigid side panels each being interconnectable in a removable manner with the two end portions and removable from interconnection therewith; and
a face plate comprising portions thereof securable with a respective one of the side panels, whereby the console is a reconfigurable modular console, wherein the pair of side panels being interconnected with the end portions and having the face plate secured thereto further comprises a reconfigurable modular console.

2. The console of claim 1 wherein the one end portion that consists of a molded material further comprises a plurality of substantially smooth, continuously rounded edge contours.

3. The console of claim 2 wherein two of the plurality of substantially smooth edge contours further intersect at a substantially smooth, continuously rounded corner contour.

4. The console of claim 3 wherein one or more of the plurality of substantially smooth edge contours further comprises a round.

5. The console of claim 4 wherein the corner contour further comprises a round.

6. The console of claim 1, further comprising a plurality of the face plates, and wherein one or more of the face plates further comprises a cutout there through.

7. The console of claim 1 wherein each side panel further comprises a clamping surface structured to receive one or more of the connectors operable for securing the face plate thereto; and wherein a spacing between the clamping surfaces of the side panels is substantially constant.

8. The console of claim 7, further comprising a plurality of the pairs of substantially rigid side panels, each of the plurality of pairs of side panels being interchangeably interconnectable with the two end portions and removable from interconnection therewith, and at least one pair of the plurality of pairs of side panels having a different length from a second pair thereof, and wherein the reconfigurable modular console further comprises different side lengths as a function of different ones of the pairs of side panels being alternately interconnected with the two end portions.

* * * * *